US007556472B2

(12) United States Patent
Arneson et al.

(10) Patent No.: US 7,556,472 B2
(45) Date of Patent: Jul. 7, 2009

(54) ASSEMBLY FOR AND METHOD OF HOUSING AN OBJECT, SUCH AS FUEL CELL BALANCE OF PLANT EQUIPMENT, FOR TRANSPORT TO AND STORAGE AT A USER LOCATION

(75) Inventors: Kirk Arneson, Danbury, CT (US); Louis F. Ernst, Jr., Yorktown Heights, NY (US); Alan Durante, Danbury, CT (US); Glenn Chenot, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 605 days.

(21) Appl. No.: 11/409,873

(22) Filed: Apr. 24, 2006

(65) Prior Publication Data

US 2007/0246325 A1 Oct. 25, 2007

(51) Int. Cl.
*B65G 1/00* (2006.01)
(52) U.S. Cl. .................. 414/808; 414/418; 414/523; 193/35 SS
(58) Field of Classification Search .......... 193/35 SS, 193/35 R; 414/416.12, 418, 499, 518, 523, 414/529, 808
See application file for complete search history.

(56) References Cited

U.S. PATENT DOCUMENTS

| | | | | |
|---|---|---|---|---|
| 2,825,193 | A | * | 3/1958 | Loveridge ................. 53/536 |
| 3,528,576 | A | * | 9/1970 | Taylor, Jr. et al. ...... 414/416.12 |
| 3,578,184 | A | * | 5/1971 | Schaich .................. 414/787 |
| 3,675,801 | A | * | 7/1972 | Larson et al. .......... 414/416.03 |
| 3,921,840 | A | | 11/1975 | Julien, Sr. et al. |
| 4,251,951 | A | * | 2/1981 | Heinstedt ................. 47/39 |
| 4,382,741 | A | * | 5/1983 | Lunardi et al. .......... 414/403 |
| 4,642,014 | A | * | 2/1987 | Saarinen ............... 414/795.3 |
| 4,984,962 | A | * | 1/1991 | Jarvinen ................ 414/812 |

(Continued)

OTHER PUBLICATIONS

The above references were cited in an Oct. 19, 2007 PCT Written Opinion of the International Searching Authority enclosed in the Oct. 28, 2008 PCT International Preliminary Report on Patentability and transmitted in the Nov. 6, 2008 PCT Notification Concerning Transmittal of International Preliminary Report on Patentability, copies of which are enclosed herewith.

(Continued)

*Primary Examiner*—Douglas A Hess
(74) *Attorney, Agent, or Firm*—Cowan, Liebowitz & Latman, P.C.

(57) ABSTRACT

System providing a substantially enclosed piece or pieces of equipment, optionally fuel cell balance of plant equipment, available for shipment and storage at a user location. The system comprises a tool, a housing associated with the tool and having openings in the flooring through which portions of the tool are inserted, and a piece or pieces of equipment having a support, the tool accommodating movement of the support, and specifically on portions of the tool inserted through the housing. Movement of the equipment occurs along the longitudinal axis of the tool between points positioned inside and outside of the housing. The tool is removed from the housing after the equipment is positioned inside thereof so that as a consequence of such removal, the support of the equipment assists in substantially sealing the housing.

3 Claims, 6 Drawing Sheets

U.S. PATENT DOCUMENTS

| | | |
|---|---|---|
| 5,056,642 A | 10/1991 | Highsmith |
| 5,377,813 A | 1/1995 | Markin et al. |
| 6,010,021 A * | 1/2000 | Zuidam et al. ............... 220/1.5 |

OTHER PUBLICATIONS

ISO (International Organization for Standardization) Standard 668, Fifth Edition, published at least as early as Dec. 15, 1995, pp. 7-11.

ISO (International Organization for Standardization) Standard 668, Fifth Edition, published at least as early as Aug. 15, 1990, pp. 81-120.

http://www.seabox.com (portions relevant to "CROP" (Container Roll-Out Platform), and EDS-A LN700), and attached pp. 1-4 relating thereto.

\* cited by examiner

ASSEMBLY FOR AND METHOD OF HOUSING AN OBJECT, SUCH AS FUEL CELL BALANCE OF PLANT EQUIPMENT, FOR TRANSPORT TO AND STORAGE AT A USER LOCATION

BACKGROUND OF THE INVENTION

This invention relates to an assembly for housing equipment, optionally, fuel cell balance of plant equipment and its support, whereby the housing serves as a shelter for the equipment during its transportation to, and storage at, a final destination.

A fuel cell is a device which provides a substantially renewable energy source that is virtually free of undesired emissions. Also, fuel cells are known to be highly efficient and thus cost-effective sources of energy production. Accordingly, many consumers of energy such as hospitals, universities, hotels and utilities, of varying size, have been attracted to the use of the fuel cells in maintaining their buildings and facilities.

A fuel cell power plant usually includes fuel cells arranged in one or more stacks situated in a module and so-called "balance of plant equipment" which is the remainder of the equipment required to operate the fuel cell module. The balance of plant equipment is typically arranged on a support frame to assist in transporting the equipment to its location of use. Transporting the balance of plant equipment has been accomplished by placing the equipment within a metal container. To do this, various techniques have been used to load the equipment within the container.

One technique involves a procedure whereby the balance of plant equipment is loaded via its frame onto a platform and then the platform containing the equipment is lifted by, for example, a forklift, and then placed into the container. Once inside the container, the equipment is off-loaded from the platform and the platform is removed from the container, thereby leaving the equipment within the container. At the user location, the balance of plant equipment is removed from the container and inserted into a housing which serves as its permanent enclosure at the location.

As can be appreciated, in the above practice, the fuel cell balance of plant equipment and its housing are transported separately to the user location. It has been observed that it would be advantageous to provide a manner of packaging the equipment and its housing together at the location of the fuel cell manufacturer. In this way, the housing could function both as the shipping container for the equipment as well as its permanent housing at the user location.

This would eliminate the effort and expense associated with the separate shipment of the equipment and housing from their respective points of manufacture as well as with the separate assembly of the equipment within the housing at the final user location. Significant economic advantages would, therefore, result.

Accordingly, it has been observed that there exists an opportunity for introducing an alternative assembly and method for transporting a piece or pieces of equipment, optionally fuel cell balance of plant, whereby the steps involved in doing so are kept to a minimum.

SUMMARY OF THE INVENTION

In accordance with the embodiment(s) of the invention disclosed hereinafter, the above opportunity is fulfilled by a system providing a substantially enclosed piece or pieces of equipment, optionally fuel cell balance of plant equipment, available for shipment between, and storage at, a user location whereby the system comprises a tool, a housing removeably engaged with the tool and having openings in its flooring through which portions of the tool are inserted, the tool accommodating movement of the equipment, on the portions thereof inserted through the housing and along the longitudinal axis of the tool between points positioned inside and outside of the housing, the portions of the tool inserted in the housing being removed from the housing after the equipment is positioned inside thereof. In certain embodiments of the system, the equipment includes a support which moves on the portions of the tool inserted in the housing and which after removal of same assists in substantially sealing the housing.

Implementation of the above system is specifically assisted through use of a tool that is useable to position an object, optionally in the form of a support holding fuel cell balance of plant equipment, within a housing optionally in the form of a standard shipping container. The tool comprises a frame having a plurality of spaced carrier members operatively connected thereto, less than the sum of such plurality being adapted for reception through correspondingly spaced openings defined by a floor of the housing, others of such plurality of carrier members being positioned beyond a periphery of the housing, the carrier members supporting and carrying the object from a point beyond the periphery of the housing to a point at which the object is entirely contained therein.

The contemplated housing to be used in achieving storage of the balance of plant equipment is, as has been mentioned, discussed herein with reference to an optional container in the form of a substantially standard shipping container. More specifically, such a container is one which has been adapted to provide a plurality of evenly spaced openings in the floor of the container adapted for correspondence with, and receipt of a plurality of rotatable members comprising the carrier members of tool as discussed above.

A method allowing realization of the advantages of using the above system is described hereinafter.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
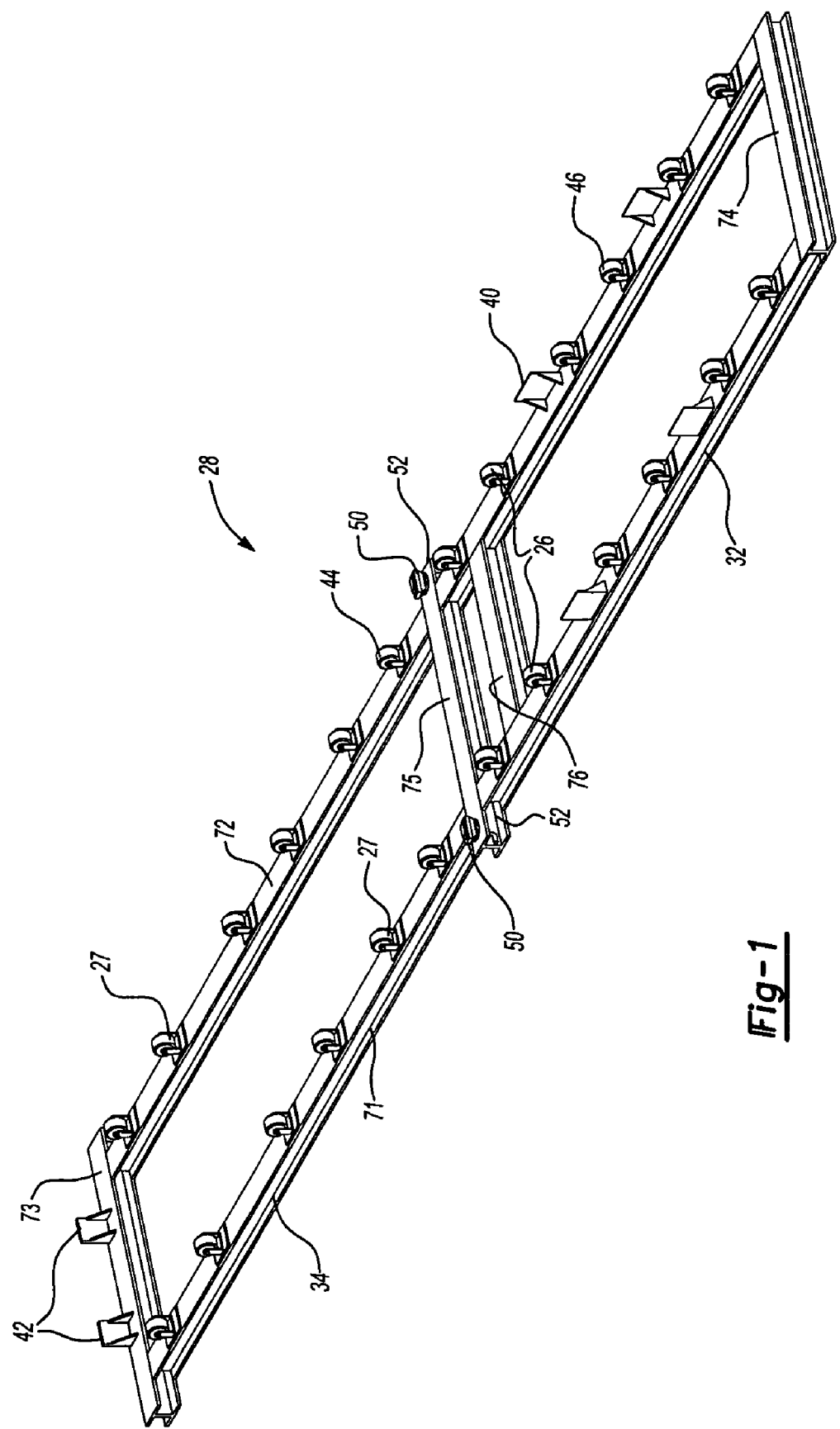
FIG. 1 is a side and perspective view of a tool useable to position an object, optionally a support holding fuel cell balance of plant equipment, within a housing, optionally a standard shipping container comprising certain adaptations enabling use of the tool therewith.
Figure 2:
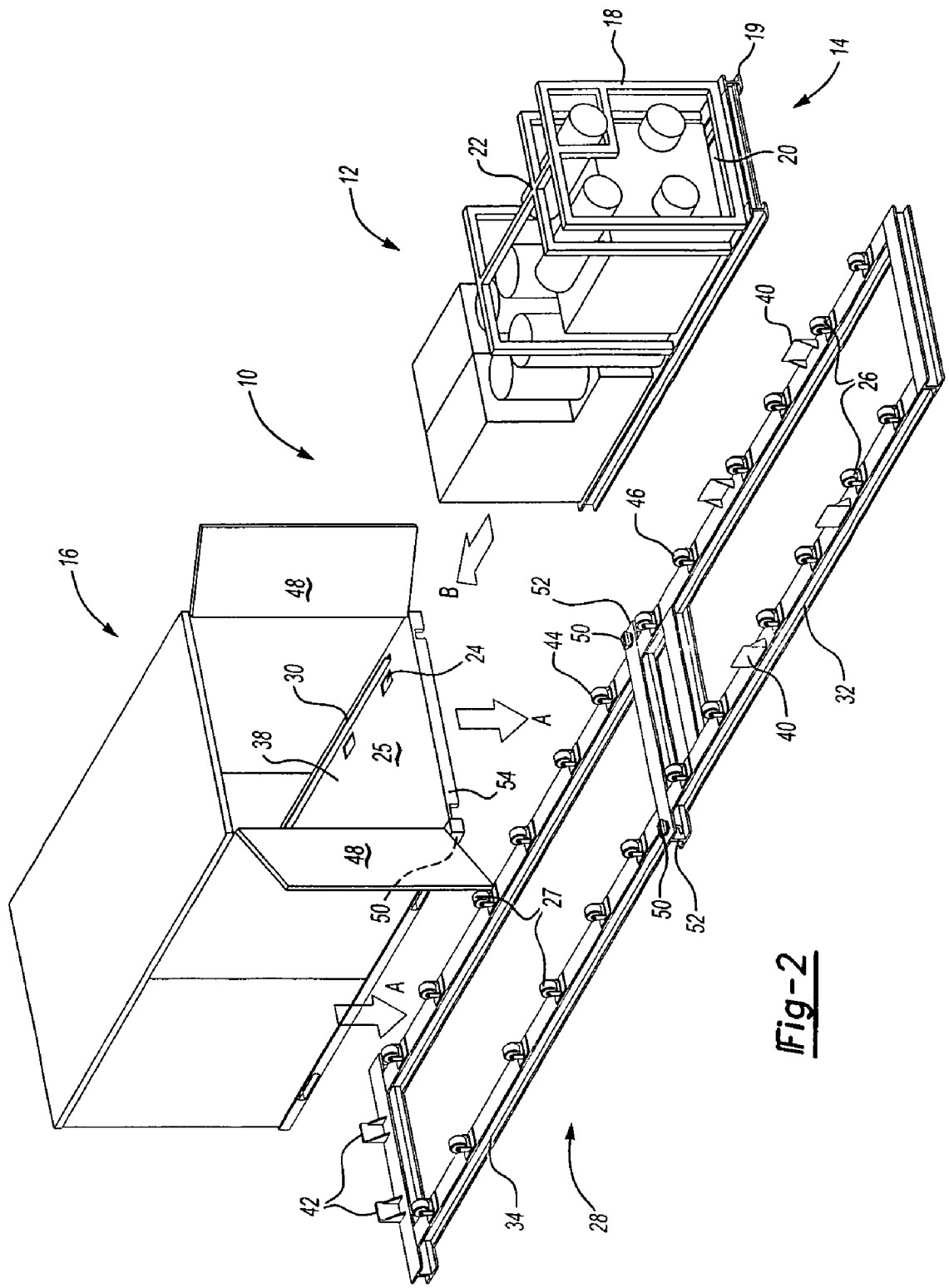
FIG. 2 is an exploded view illustrating an assembly, and method therefor, of the fuel cell balance of plant equipment and support, the container and the tool.

Looking to FIGS. 1-2, there is shown a system 10 for providing a substantially enclosed piece or pieces of equipment, such as fuel cell balance of plant equipment 12, that may be transported to and stored at a user location. Moreover, the system 10 enables the fuel cell balance of plant equipment 12 and its support or holding apparatus 14 to be packaged in a housing 16 that is intended to be a permanent shelter therefor at the user location. As is shown, the support 14 comprises a network of structural steel members 18, 19 which provide a foundation 20 on which the fuel cell components 22 rest.

The housing 16 comprises, optionally, a substantially standard shipping container substantially conforming to dimensional standards set out by the International Organization for Standardization. As may be seen in the Figures, the standard container 16 is adapted to comprise a plurality of spaced openings 24 incorporated as part of its flooring 25. The openings 24 are arranged in rows on opposite sides of the flooring 25 and correspond, in both size and respective distance spacing from one another, to the carrier members 27 of a tool 28 used in the positioning of the support 14 within the container 16, as is discussed below. Opposite each row of openings 24, a guide rail 30 is mounted to the container flooring 25 for assisting in the positioning of the support 14 within the container 16. Only one row of openings 24 and one of the guide rails 30 is shown given symmetry about the longitudinal axis of the container.

The system 10 further comprises the tool 28. As shown most clearly in FIG. 2, the tool 28 comprises at least two interconnected structural steel frame sections comprising a staging frame section 32 and a container frame section 34. The frame sections 32, 34 are formed from sections of spaced opposing I-beam members 71, 72 whose forward and rear ends and whose midpoint are connected by further I-beam members 73, 74, 75 and 76. The I-beam members 71-76 are joined to each other by welding.

Figure 6:
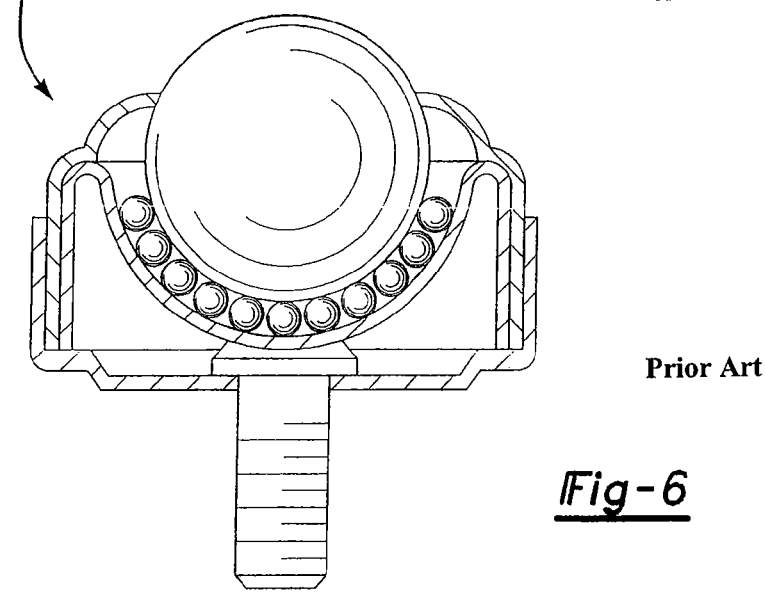
FIG. 6 is a cross-sectional view of an alternately designed portion of the prior art for use with the tool.
Figure 7:
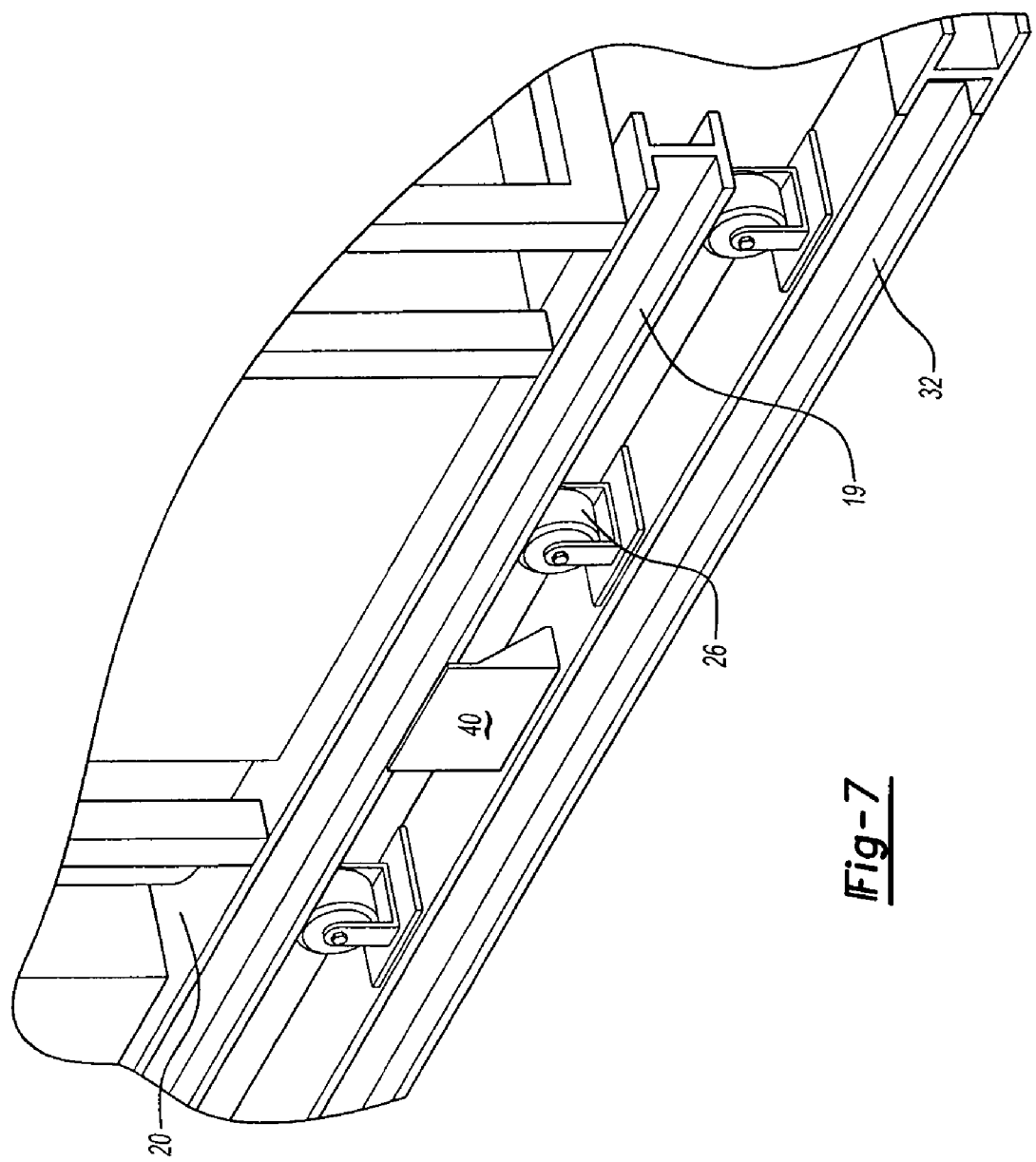
FIG. 7 is a side and perspective view illustrating a cutaway portion, of FIG. 3, showing the positioning of the fuel cell balance of plant equipment upon the tool as the equipment is set to be moved toward and into the container.
Figure 8:
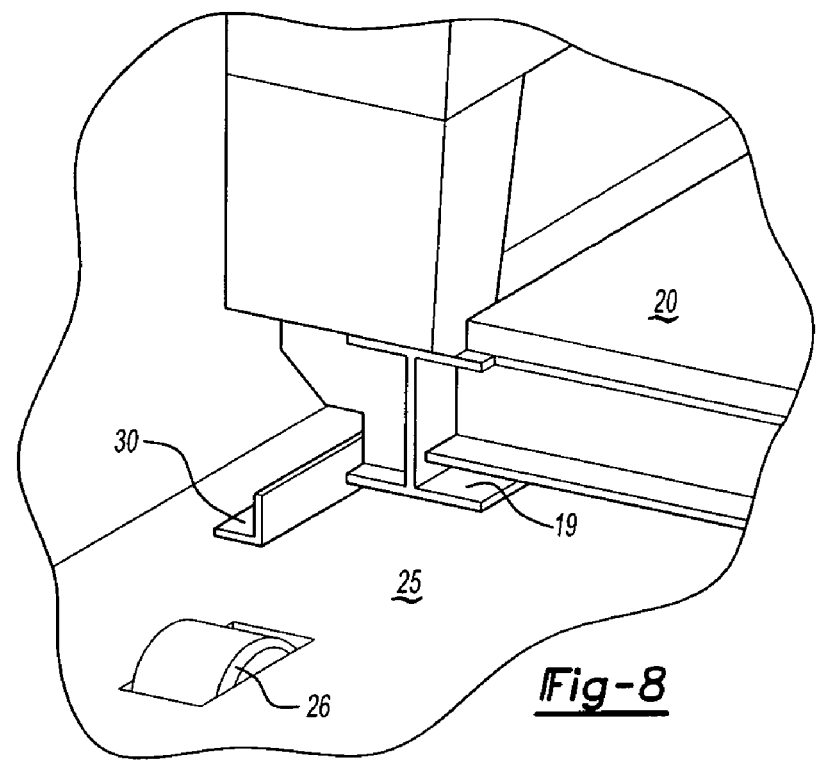
FIG. 8 is a side and perspective view illustrating a cutaway portion, of FIG. 4, showing placement of the fuel cell balance of plant equipment within the container and before removal of the tool from the container.

Mounted atop each of the sections 32, 34 are a series of equidistantly spaced carrier members 26, 27, respectively. The carrier members 26, 27 comprise, optionally, bracket-mounted upstanding rollers, or, as is also contemplated, ball transfer systems 36, an example of which is shown in FIG. 6. As will be understood from the ensuing description, the carrier members 26, 27 support and carry the support 14 and fuel cell balance of plant equipment 12 from a point outside the periphery of the container 16 to the inside 38 thereof until these components become positioned entirely therewithin. A plurality of guides 40, optionally in the form of L-shaped brackets adapted for contact with the support members 19, are provided atop the staging frame section 32. The guides 40 assist in ensuring that the support 14 moves toward the container 16 in a substantially tracked manner.

Figure 3:
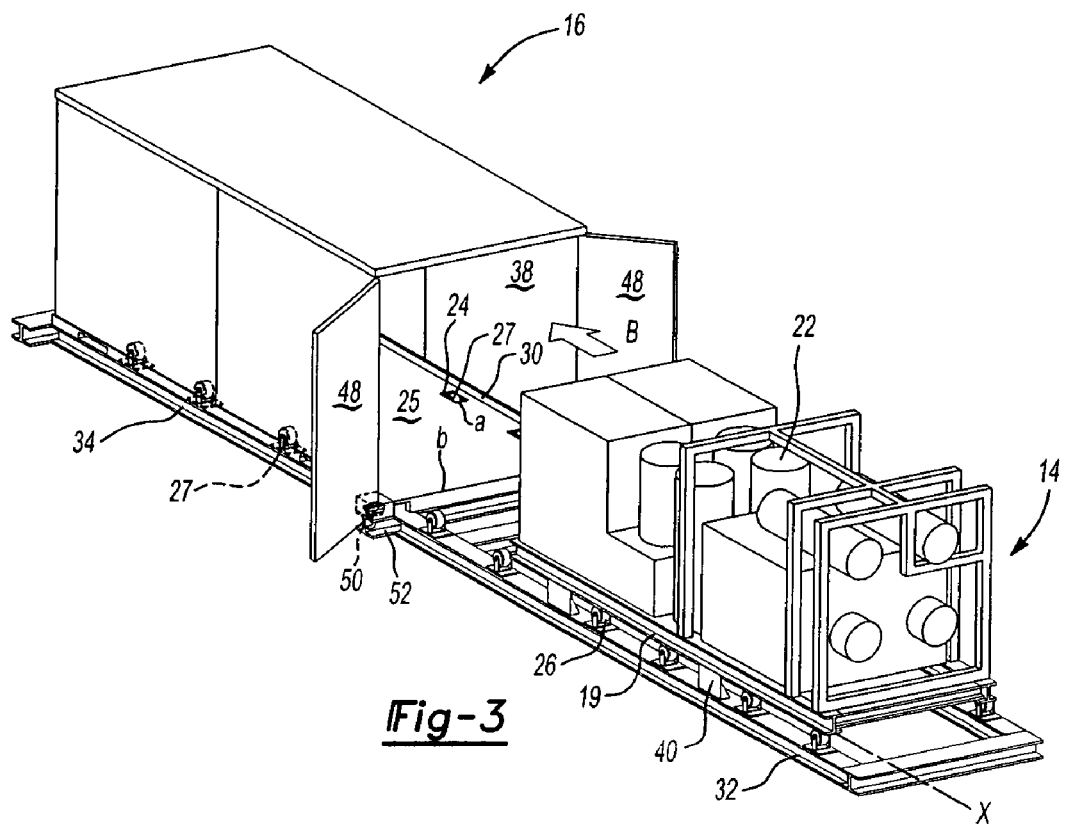
FIG. 3 is a side and perspective view of the loading of the fuel cell balance of plant equipment into the container through use of the tool.
Figure 4:
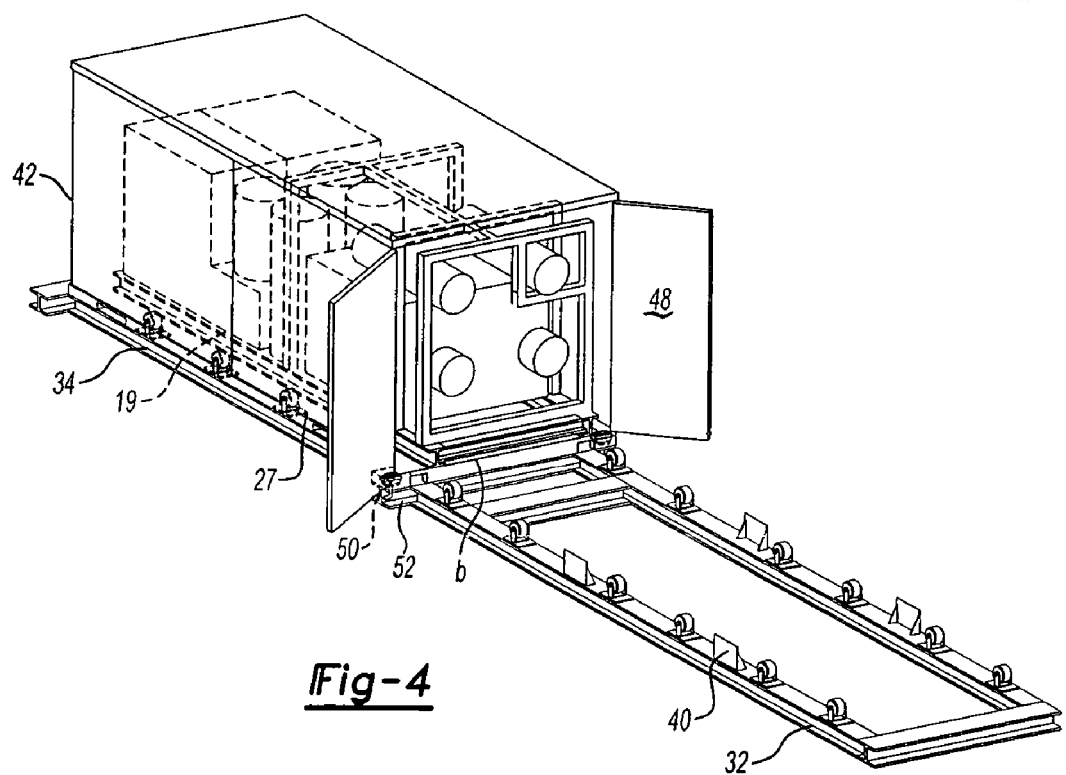
FIG. 4 is a side and perspective view according to FIG. 3, in which loading of the fuel cell balance of plant equipment is completed whereby the assembly is positioned entirely within the container.
Figure 5:
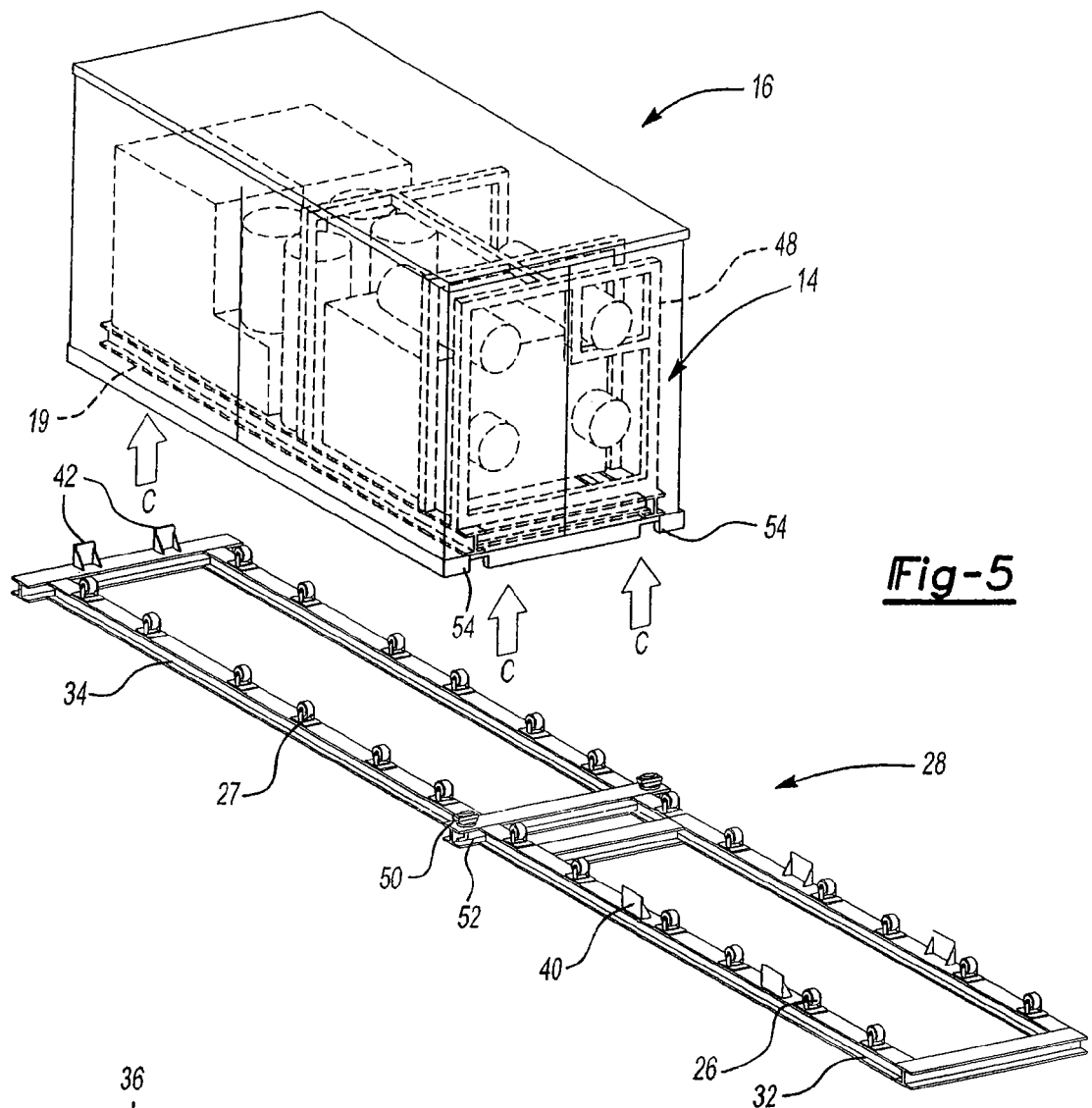
FIG. 5 is a side and perspective view illustrating removal of the combination of the fuel cell balance of plant equipment and container from the tool wherein the equipment is thereafter substantially sealed within the container.

With continued reference to FIG. 2, and additional reference to FIGS. 3-5, the assembly of the support 14 and the supported fuel cell balance of plant equipment 12 within the container 16 may be further understood. As shown in FIG. 2 by directional arrows "A", it is contemplated that the container 16 be moved downwardly toward the tool 28 by various equipment (not shown) and seated upon the container frame section 34, as shown in FIG. 3.

The container frame section 34 comprises at least a pair of installation guides 42, similar in construction to the guides 40, for assisting in directing the seating of the container 16 upon the tool 28.

In looking to FIGS. 3-4, it is to be understood that as the seating of the container 16 occurs, the carrier members 27 each pop through the various corresponding openings 24 as at "a" such that the carrier members 27 register therewithin, and extend slightly above the flooring 25 of the container 16. Because of that extension, top portions 44 of the carrier members 27 of the container frame section 34 are located along an axis "X" (an axis parallel to the length of the container 16) shared with top portions 46 of the carrier members 26 of the staging frame section 32. Movement of the fuel cell balance of plant equipment 12 and support 14 on the carriers 26 toward the inside 38 of the container 16 from the staging frame section 32 onto the carrier members 27 of the container frame section 34 thus occurs smoothly along axis "X" on either side of the support 14.

While supported upon the carrier members 26 of the staging frame section 32, application of a force on the support 14 causes the carrier members 26 to carry the support 14 and fuel cell assembly 12 toward the container 16 in the direction indicated by arrow "B". Guides 40 maintain substantially tracked movement of the support 14 as the support foundation members 19 ride the carrier members 26 across the threshold, as at "b" and defined at the periphery of the container 16 and its junction with the staging frame section 32, toward and into the container 16 via the carrier members 27.

Continued application of force on the support 14 enables movement thereof completely within the container 16, as shown in FIG. 4. Thereafter, container cargo doors 48 may be closed.

With reference to FIG. 5, the container 16 is readied for removal from the tool 28 once the cargo doors 48 have been closed. The same equipment that had been used in seating the container 16 on top of the tool 28 is also used in removing it therefrom. That removal occurs in the direction indicated by arrows "C" whereby the container 16 is moved upwardly and out of contact with any portion of the tool 28. As this upward movement takes place, gravity forces portions of the appropriate foundation members 19 to overlay the openings 24 that had been occupied by the carrier members 27. As a consequence, the apparatus is then substantially sealed within the container 16 making it available for shipment between and storage at a variety of locations. It will be realized that use of the members 19 in providing for the closing of the openings 24 is advantageous since they make unnecessary the need for additional structure that is to be used for such closing.

Figure 9:
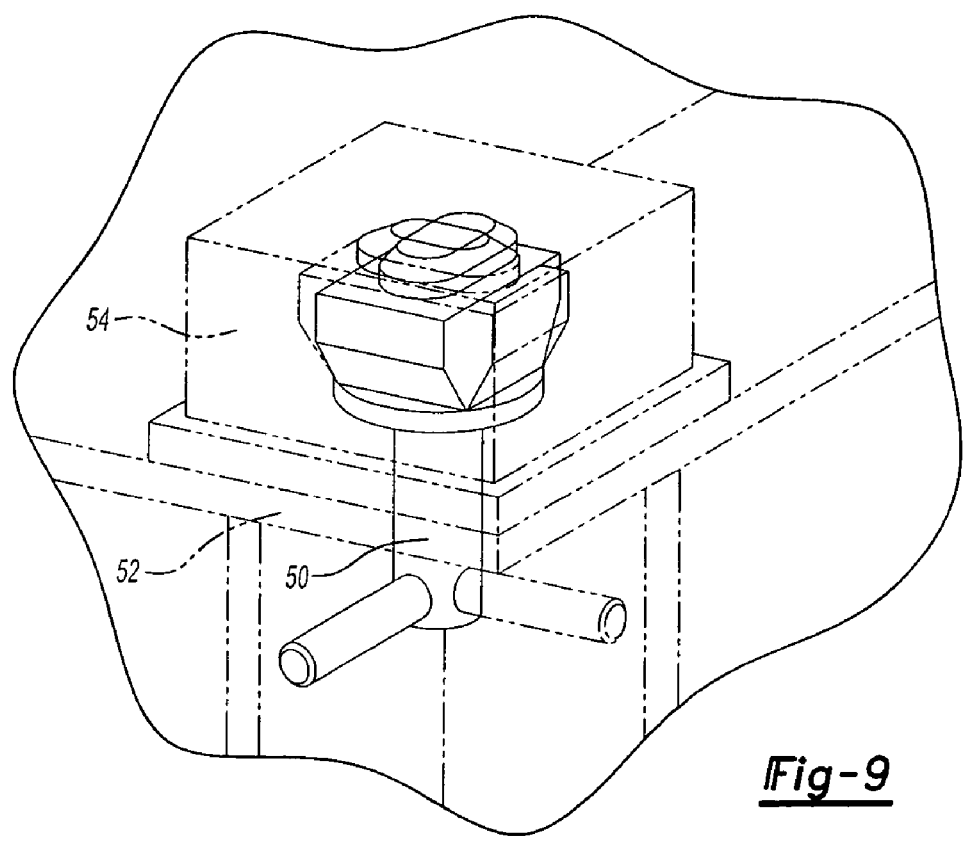
FIG. 9 is a side and perspective view illustrating attachment of the container to the tool.

With reference to FIGS. 1-5 and 9, and most specifically to FIG. 9, there is shown a twistlock 50 integrally formed at and with corners 52 of the container frame section 34. The twistlock 50 is matingly engageable with corners 54 of the container 16 to lock the container 16 to the tool 28 during movement of the support 14 into the container 16. Prior to removal of the container 16 from the tool 28, the twistlock 50 is manipulated to allow for such removal.

Accordingly, there is provided a system for providing a substantially enclosed piece or pieces of equipment, such as fuel cell balance of plant equipment, that may be transported between and stored at a user location. As can be appreciated, the system and tool of the invention are usable for any types of objects or equipment where the object or equipment has to be transported from one location to another. The system and tool are also usable for objects to be stored in a housing using the tool and system and transported in the housing to a location where it is intended that the object be removed from the housing after transportation to the location. In such case, the tool and system can be used at such location to remove the object from the housing using the inverse of the procedure discussed above.

In all cases it is to be understood that the above-described subject matter is merely illustrative of the many possible specific embodiments, which represent applications of the present invention. Numerous and varied other arrangements can be readily devised in accordance with the principles of the present invention, without departing from the spirit and scope of the invention.

What is claimed is:

1. A method of packaging a piece or pieces of equipment, within a housing, the housing being made available for transport to a user a location to allow storage of the equipment in the housing thereat, the method comprising:

providing a housing by adapting a substantially standard shipping container to comprise a plurality of openings throughout a flooring thereof as well as a plurality of doors;

providing a tool comprising a plurality of carrier members along first section and a second section preceding the first section of the tool;

positioning the housing atop the first section of the tool such that the carrier members thereof are received through the openings of the flooring of the housing, the housing being supported upon the tool thereafter;

positioning the equipment atop the carrier members of the second section of the tool;

applying a maintained force to the equipment, the force causing the plurality of carrier members to carry the equipment toward and inside of the housing;

ceasing application of the force once the equipment is positioned entirely within the housing;

ensuring closure of the doors; and removing the housing from the tool such that the housing is no longer supported by the tool, the equipment is then substantially supported by the housing;

the housing being adapted to be used to ship the equipment after the equipment is positioned in the housing and being further adapted to be a permanent housing for the equipment when the equipment is positioned in the housing and the housing is at the location where the equipment is used.

2. The method as recited in claim 1, wherein:

portions of the equipment overlay the openings along the flooring of the housing, so as to provide a substantially sealed enclosure for the equipment.

3. The method as recited in claim 1, further comprising:

shipping the housing with the equipment in the housing to a location where the equipment is to be used;

and using the housing with the equipment in the housing to permanently store the equipment in the housing at the location.

\* \* \* \* \*